United States Patent [19]

Zuehsow

[11] Patent Number: 4,735,377
[45] Date of Patent: Apr. 5, 1988

[54] REMOTE CONTROL HOLDER
[76] Inventor: Richard A. Zuehsow, 11 Devonshire Dr., Sterling, Va. 22170
[21] Appl. No.: 933,999
[22] Filed: Nov. 24, 1986
[51] Int. Cl.⁴ ............................................. B65H 75/48
[52] U.S. Cl. ................................. 242/107; 191/12.2 R
[58] Field of Search ................. 242/107, 107.6, 107.7; 191/12.2 R, 12.4; 248/79, 80, 90

[56] References Cited

U.S. PATENT DOCUMENTS 1,576,965  3/1926  Giese ................................. 242/107.7
4,114,273  9/1978  McGaha ........................... 242/107.6

Primary Examiner—Joseph Falk
Attorney, Agent, or Firm—James Creighton Wray

[57] ABSTRACT

Remote control holders are provided for wireless and wired remote control units. A spring recoil mechanism provides automatic takeup of cord connecting the remote control unit to an audio-visual component, such as a stereo receiver or television video cassette player. For wireless remote control units, a vertical support is rotatably supported on a horizontal base. The vertical support has a number of sides that corresponds to the number of pockets for holding remote control units.

9 Claims, 3 Drawing Sheets

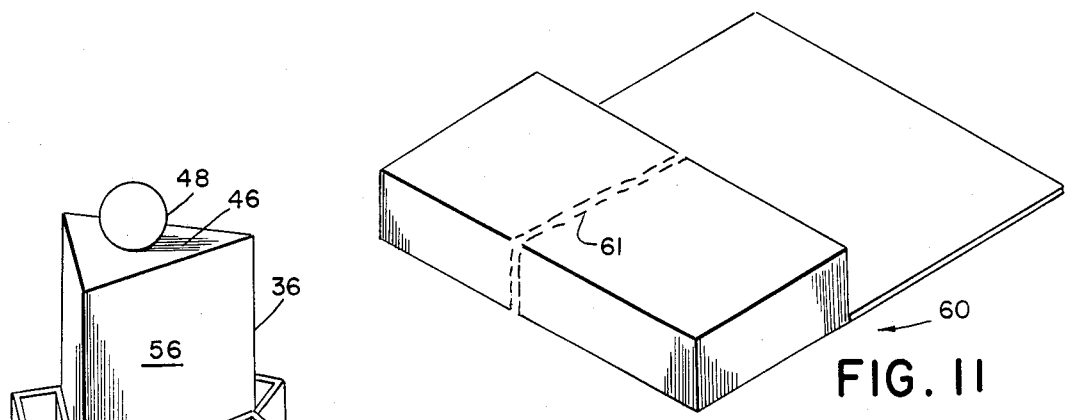
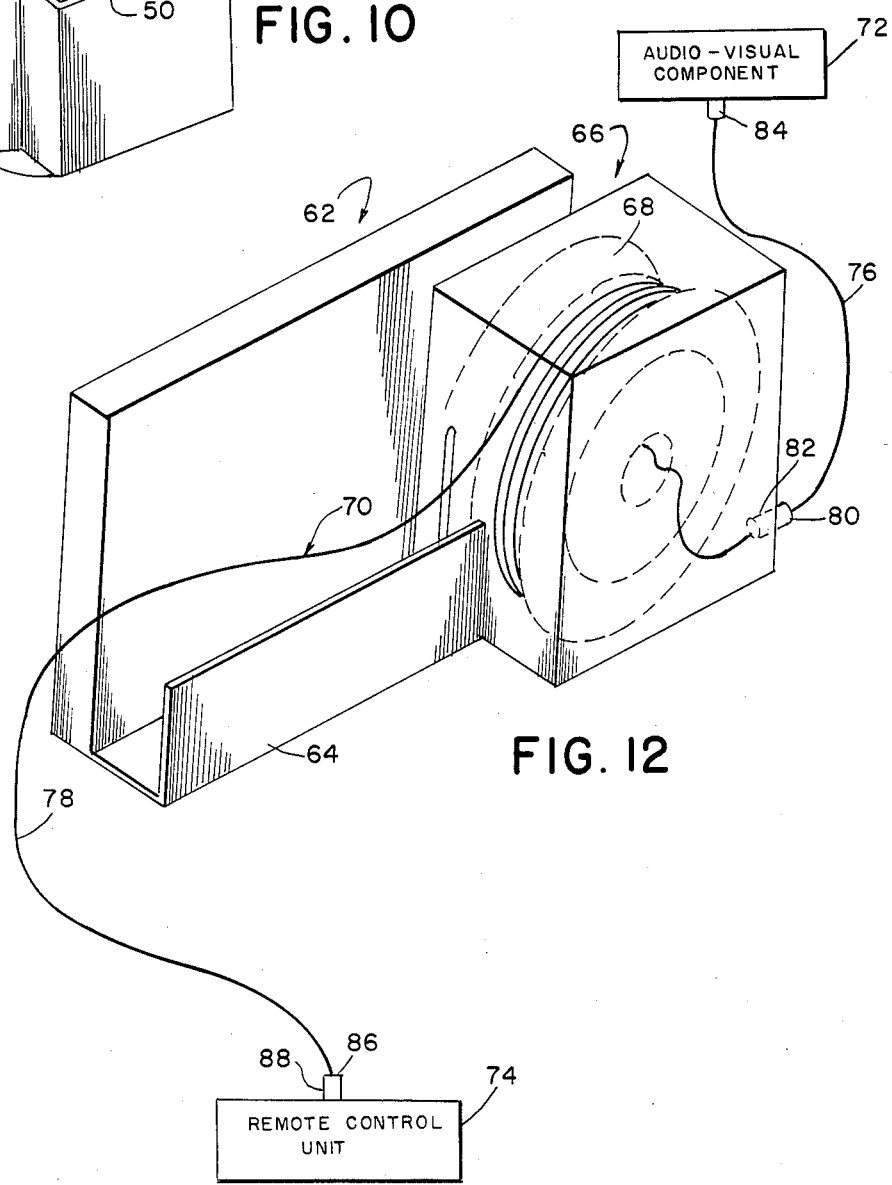

REMOTE CONTROL HOLDER

BACKGROUND OF THE INVENTION

With the recent rise in popularity for home video cassette players, a problem has developed that, for those players having remote control units, no adequate means have previously been provided for organizing the remote control units. Often, several remote control units may be provided in a single household. One may be needed to control the television, another to control the video cassette player, and yet another to control a stereo system.

Without organization, it is common to have wired control units in disarray with several feet of wire cluttering the user's living quarters. Wireless remote control units, on the other hand, without means for organization, often times end up lost or hidden in sofas and chairs and may end up being damaged as a result.

The present invention obviates this problem by providing various holders which are functional yet attractive to the point that they blend in with existing furniture.

SUMMARY OF THE INVENTION

In one embodiment of the invention, a holder for a wired remote control unit is provided with a shelf for holding the remote control unit. The shelf is open at a forward end and abuts a spring recoil mechanism at the rearward end. The holder is preferably attached to a television or a television video cassette player, such that as a viewer advances toward the television, the spring recoil mechanism automatically takes up the cord that connects the remote control unit to the audio-visual component, i.e., the video cassette player. The holder may also be used for a television remote control unit, as opposed to a television video cassette player. In either case, the spring recoil mechanism organizes the cord and provides a resting place for the remote control unit.

The holder described above is wired to be readily adapted for use with any audio-visual component. An existing wired unit can be adapted to use the above-described embodiment by cutting the existing cord near where the cord exits the particular audio-visual component and then splicing the cut end into a stationary end of a wound cord which is wound around a takeup spool. The opposite end of the wound cord may be spliced into the remote control unit near where the cord exits the remote control unit. The remote control unit provided with the audio-visual component will have to have its existing cord cut near the remote control unit so as to allow for the replacement of the cord with the wound cord provided in one embodiment of the invention. However, in another embodiment, the holder comes without a length of cord wound around the spool. Instead, the existing cord is cut as described above near where the cord exits the audio-visual component. The cut end is spliced into, or is electrically connected to a short connector wire that connects the audio-visual component output wire to the takeup reel. Then, the remote control unit, having a length of control unit cord, is wired to the takeup reel and is then wound around the takeup reel.

The various electrical connections are conventional and can include adaptors or connectors, such as the prong connectors or male-female connectors. Also, the spring recoil mechanism itself has been used in the past to wind power cords for vacuum cleaners and drop lights, etc. Any conventional spring recoil mechanism can be used in the present invention. In a departure from the known recoil mechanisms, however, the present invention contemplates, in one embodiment, the winding of an existing remote control unit cord around a takeup spool after cutting the existing cord near where the cord exits the audio-visual component, wherein the cut ends of the cord are connected to the spring recoil mechanism to complete a wiring circuit that runs from the audio-visual component through the spring recoil mechanism and to the remote control unit.

Various means are contemplated for attaching the wired remote control unit holder to a television or television video cassette player. In one embodiment, VELCRO-type micro-hook and micro-loop fasteners can be applied to abutting surfaces of the holder and the component. In another embodiment, the holder can be attached by means of screws. In another embodiment, the holder may be attached by adhesive means, wherein the adhesive may be in the form of an adhesive backing for the support plate of the holder.

In another embodiment of the invention, a wireless remote control holder comprises a pocket which has a flat backing and a rectangular pocket, either connected to or integrally formed with the backing. A second pocket may be hung from the first pocket and either or both pockets may be attached to a stationary object, such as a couch or chair, by the aforementioned micro-hook and micro-loop fasteners. In this embodiment, the micro-hook or micro-loop fasteners would be connected to a rearward surface of the backing plate. A corresponding strip of micro-hook or micro-loop fasteners could be attached to a chair, sofa or other fixed furniture object, depending on the needs of the viewer. Depending on the material that covers a sofa or chair, micro-hook fasteners on the rearward surface of the holder may be sufficient alone to attach the holder to the stationary object.

In another embodiment of the invention, a holder for wireless remote control units is self-supporting on a base that rotatably carries a vertical support which has a number of sides corresponding to a number of pockets. The base adequately supports the holder on top of furniture such that the holder may be turned with a knob provided at the top of the vertical support.

In all of the aforementioned embodiments, the holders may be made of plastic material, such that the entire unit could be integrally molded in a one-piece construction. However, in the wired holder, the housing which covers the spring recoil mechanism should be removable. Plastic materials are desirable for their strength, low cost and stylish appearance. In other embodiments, however, wood and metals may be used to fabricate the various components.

An object of the invention is to provide an audio-visual accessory comprising a support plate, a narrow shelf connected to an edge of the support plate, the shelf being adapted to hold a control unit and a recoil mechanism adapted to release and take up a length of control unit cord and being connected to a rearward end of the shelf, wherein the length of control unit cord has one end connectable to a control unit and the opposite end connectable to an audio-visual component.

Another object is to provide a housing for covering the recoil mechanism.

In one embodiment, the housing is a rectangular box connected to the support plate and has one side abutting the shelf.

In another embodiment, the abutting side wall has an opening for passage of the length of control unit cord.

In another embodiment, the shelf has a bottom wall extending outwardly from the support plate and a side wall extending upwardly from an outer edge of the bottom wall, wherein the side wall and the support plate are substantially parallel.

In one embodiment, the side wall is stepped.

Another object is to provide, attachment means for attaching the accessory to an audio-visual component.

Preferably, the attachment means comprises micro-hook and micro-loop complementary fasteners, wherein one complement is attached to the audio-visual component and the other is connected to the accessory.

In one embodiment, the recoil mechanism is a spring recoil mechanism having a takeup reel and provides manual release and automatic takeup due to spring tension, whereby the manual release of cord from the takeup reel adds tension to a spring while the takeup is by means of tension release in the spring.

Another object of the invention is to provide a remote control holder for wireless audio-visual remote control units comprising a support plate, a pocket adapted to receive a remote control unit and being connected to the support plate, and holder attachment means for attaching the holder to a stationary object.

Preferably, the pocket is substantially rectangular and extends partially over the support plate.

Another object is to provide a second pocket adapted to receive a second remote control unit, and means for connecting the second pocket to the first pocket.

In one embodiment, the means for connecting the second pocket comprises a hook connected to the second pocket for hanging the second pocket on the first pocket.

Another object of the invention is to provide a remote control holder for wireless audio-visual remote control units, comprising a plurality of pockets, each adapted to receive a remote control unit, and each being equidistantly spaced around a vertical support, and a base having a spindle extending upwardly therefrom, the vertical support having a central recess in a bottom wall for receiving the spindle, thereby permitting rotation of the vertical support, wherein the number of sides of the vertical support is equal to the number of pockets.

Preferably, the base is disc-shaped and the spindle is larger than the recess is deep to space the disc from the vertical support, and the pockets and the walls of the vertical support are equal in width.

In one preferred embodiment, the pockets have the same height and are shorter in length than the vertical support.

Another object is to provide a handle disposed on top of the vertical support to facilitate manual rotation of the vertical support.

In one embodiment, the vertical support and pockets are integrally molded plastic.

In another embodiment, the vertical support is an equilateral polyhedron.

BRIEF DESCRIPTION OF THE DRAWINGS

FIG. 10 is another perspective view of the embodiment of FIG. 3 with some modifications.

FIG. 11 is a perspective view of another embodiment of the invention.

FIG. 12 is a perspective view of the embodiment of FIG. 3, with some modifications, and showing details of the spring recoil mechanism.

DETAILED DESCRIPTION OF THE INVENTION

Figure 1:
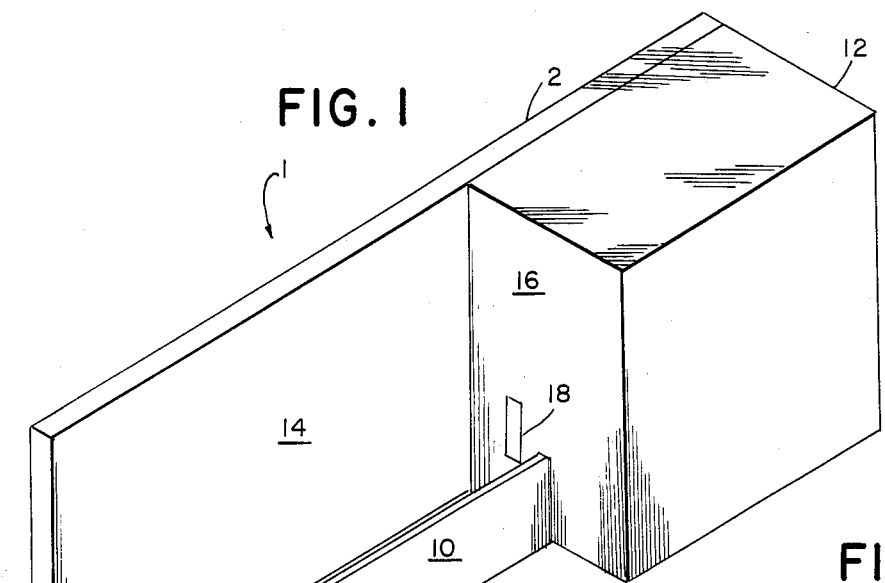
FIG. 1 is a perspective frontal view of one embodiment of the invention.

Referring to FIG. 1, a wired remote control holder is generally referred to by the numeral 1. The holder has a support plate 2 that is preferably flat and rectangular in shape. A rearward surface of the support plate 2 may be provided with attachment means, such as an adhesive backing or micro-hook or micro-loop fasteners.

A shelf 4 extends outwardly from a bottom edge 6 of the support plate 2. The shelf 4 may be integrally formed with the support plate 2 as in the case where molded plastic materials are used. Preferably, the shelf 4 has a bottom wall 8 that extends outwardly at a right angle to the support plate 2. A side wall 10 extends upwardly from the bottom wall 8 and is preferably at a right angle to the bottom wall such that the side wall 10 and the support plate 2 are spaced apart and parallel. The space between the support plate 2 and the side wall 10 approximately corresponds to the width of a remote control unit which is supported on the bottom wall 8 between the support plate 2 and the side wall 10.

A housing 12 is provided to cover the spring recoil means (not shown). The spring recoil mechanism that is contemplated for use in FIG. 1 is the same as the one contemplated and illustrated in FIG. 12. The housing 12 extends upwardly from a frontal surface 14 of the support plate 2 and may be connected to the support plate by any conventional means, including screws, adhesives, and snap fittings.

The housing 12 is preferably rectangular is shape and has a forward facing side 16 which is provided with an opening 18 for passage of the remote control unit cord. When the remote control unit is placed on the shelf 4, with its cord end facing the forward facing side 16 of the housing 12, the cord will be fully wound in the housing.

Figure 2:
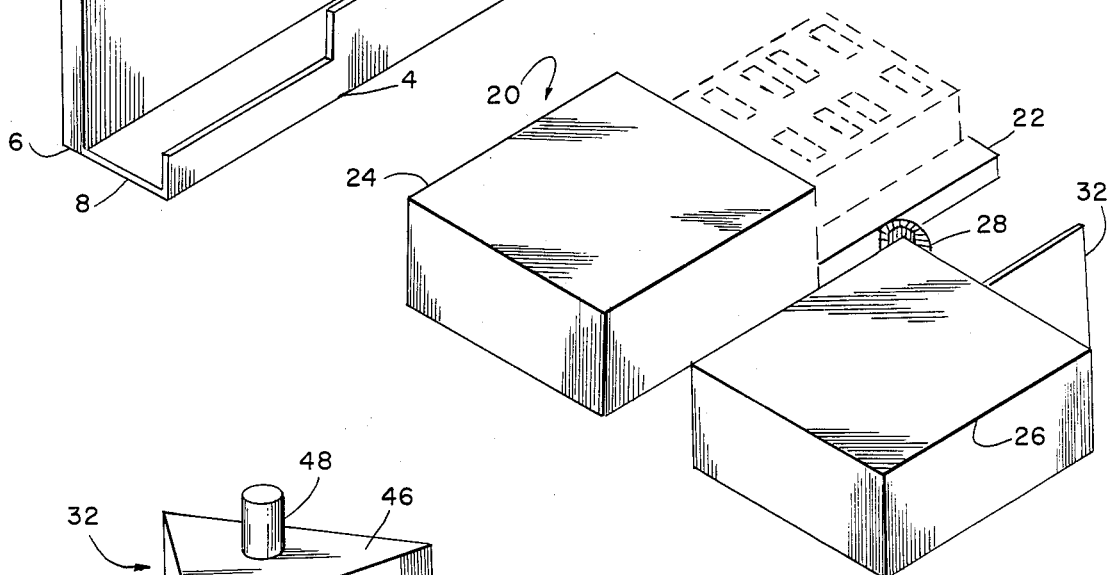
FIG. 2 is a perspective view of another embodiment of the invention.

Referring to FIG. 2, another embodiment of the invention is shown for use with wireless remote control units. The holder 20 is provided with a support plate 22 which may, in a similar fashion to the embodiment of FIG. 1, be provided with attachment means that include micro-hook and micro-loop complementary fasteners.

A lower portion of the support plate 22 is provided with a rectangular pocket 24 which is either integrally formed with the support plate or separately formed and then connected to the support plate by any conventional means that may include adhesive means or screws.

The pocket 24 only partially covers the support plate 22 so that the wireless remote control unit can be easily withdrawn from the pocket.

A second pocket 26 may be attached to the first pocket 24 by means of a hook 28 that hangs the pocket 26 from an upper edge 30 of the first pocket 24. The support plate 32 of the second pocket 26 may be tapered as a space-saving feature; however, the second pocket 26 could also have a completely rectangular support plate to resemble the first support plate 22.

Figure 8:
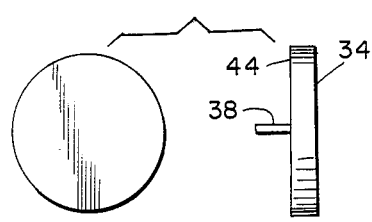
FIG. 8 is a detailed view of the base that is used in the embodiment of FIG. 3.

Referring now to FIGS. 3-10, another embodiment of a holder 32 is shown for wireless remote control units. The holder 32 has a base 34 for rotatably supporting a vertical support 36. The base 34 is preferably disc-shaped as shown in FIG. 8, and is provided with a spindle 38 which is fitted into a recess 40 formed in a bottom 42 of the vertical support 36. Preferably, the length of the spindle 38 is slightly longer than the depth of the recess 40, such that the bottom 42 of the vertical support 36 is spaced from an upper surface 44 of the base 34.

The top 46 of the vertical support 36 supports a knob 48 which acts as a handle to rotate the vertical support 36 about the spindle 38. The knob 48 may have the appearance shown in FIG. 3 or it may have the spherical shape shown in FIG. 10. In either case, the knob 48 has to be fixedly connected to the top 46 in order to function as a handle for turning the vertical support 36.

One feature of the present invention is that the vertical support carries a plurality of pockets 50 which are adapted to receive wireless remote control units. To balance the holder, the number of pockets 50 corresponds to the number of sides of the vertical support 36. Also, the width 52 of the pocket 50 substantially corresponds to the width 54 of a side 56 of the vertical support 36.

It should also be noted that the length of the height 58 of the pockets 50 is less than the height of the vertical support 36 so as to allow access to remove a wireless remote control unit.

Figure 3:
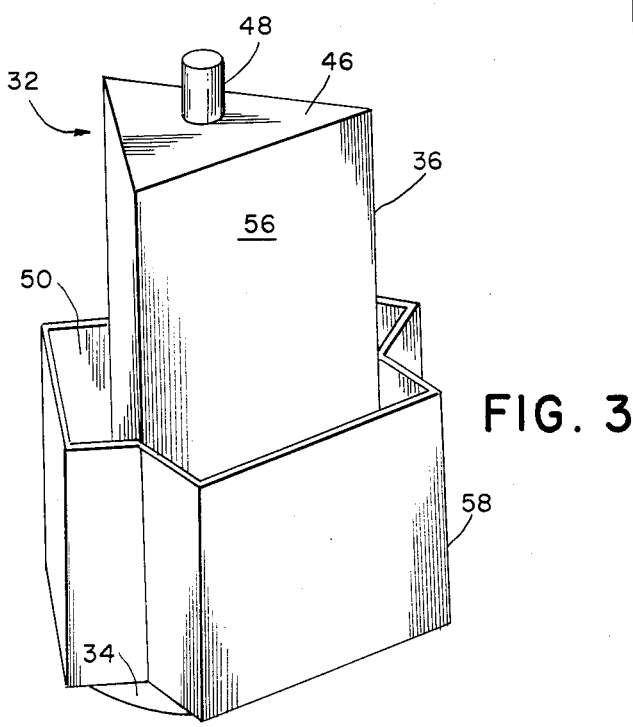
FIG. 3 is a perspective view of another embodiment of the invention.
Figure 4:
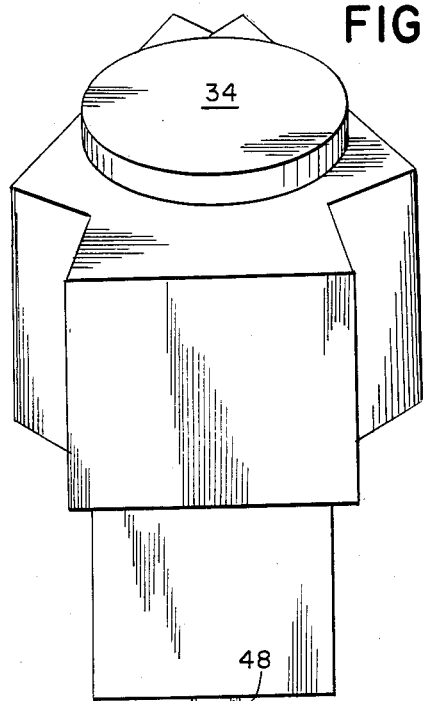
FIG. 4 is a perspective view from the bottom of the embodiment of FIG. 3.
Figure 5:
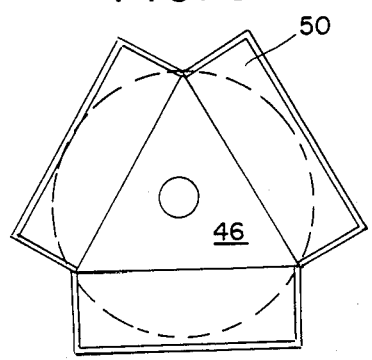
FIG. 5 is a plan view of the embodiment of FIG. 3.
Figure 6:
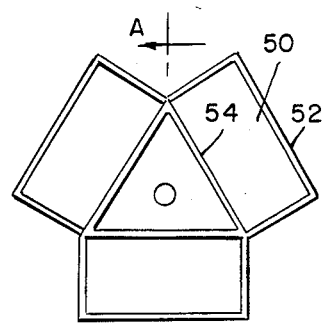
FIG. 6 is a top view of the embodiment of FIG. 3.
Figure 7:
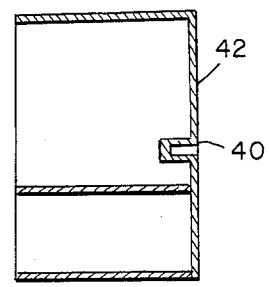
FIG. 7 is a cross-sectional view taken along line A—A of FIG. 6.
Figure 9:
FIG. 9 is a detailed view of the vertical support used in the embodiment of FIG. 3.
Figure 9:
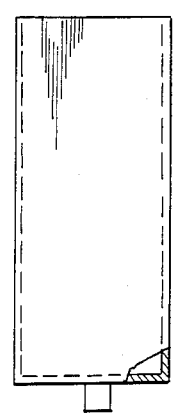

The entire holder of FIG. 3, except for the base and knob, may be made of one-piece molded plastic, in which case, the vertical support would be hollow (see FIG. 9). The top 46 could be separately formed and removable so as to allow access to the hollow interior of the vertical support for storage of materials.

The drawing of FIG. 10 more or less illustrates that the pockets 50 could be separately formed and attached to the vertical support by any conventional means that includes adhesive bonding, screws, rivets, or snap fittings.

FIG. 11 simply shows another embodiment of a holder 60 which is similar to the holder 20 except that the holder 60 has a wider dimension. The holder 60 could be provided with a hook similar to the hook 28 shown in FIG. 2. The embodiment of FIG. 11 may be provided with a divider 61 which separates the pocket into two halves.

FIG. 12 illustrates the recoil mechanism contemplated for use in either the FIG. 1 or FIG. 12 embodiment of a holder. The FIG. 12 holder differs only slightly from the FIG. 1 embodiment in that the holder 62 of FIG. 12 is provided with an L-shaped shelf 64 which does not have a stepped portion shown in FIG. 1.

Spring recoil mechanisms are generally known and more or less conventional mechanisms can be used in the present invention.

The spring recoil mechanism 66 has a takeup reel 68 which rotates within the housing. A spring (not shown) tightens as the cord 70 is manually withdrawn from the housing by a user. The spring will have a conventional lock which prevents undesirable takeup of the cord 70.

As is known in the spring recoil art, a desired release of spring tension for the purpose of taking up the cord 70 can be initiated by a slight outward tug of the cord 70 followed by a release of the cord which, following the release, automatically winds around the takeup reel 68.

To install the embodiment of FIG. 12, a conventional audio-visual component 72 will normally be provided with a wired remote control unit 74 which has a length of cord 70 extending between the component 72 and the control unit 74.

The cord 70 may be cut at a point near the audio-visual component 72, leaving a short segment 76 and a long segment 78. The short segment 76 may be provided with a connector 80 which is received in a mating connector 82 fixed within the housing. The mating connector 82 is connected to the takeup reel 68 and the cut end of the long segment 78 is likewise connected to the takeup reel 68. After making the connections, the long segment 78 of cord 70 is wound around the takeup reel 68. The cord should be wound initially by a release of tension in the spring, such that when the cord is withdrawn tension is applied to the spring once again to provide energy for the rewinding.

The electrical connections between the various cord segments are known and can be the same as those used in electric power cords which use spring recoil mechanisms. These known power cord applications include drop cords and power vacuum cleaners, as well as other household appliances. The essential requirement is that there is a complete circuit between the audio-visual component and the remote control unit.

In another embodiment of the invention of FIG. 12, the holder could include a remote control unit, complete with wiring that need only be connected to the audio-visual component 72 with connector 84.

In another embodiment, an existing remote control unit 74 with a length of cord 70 can be cut and provided with a connector as at 80. However, the invention can provide a length of cord 70 to suit the individual needs of the user. In this embodiment, the existing cord that came with the remote control unit 74 would be cut at 86 to remove the existing cord from the point 86 and the connector 80. The cord 70 would be provided, as mentioned, in a length to suit the needs of the user. The cord 70 would therefore require the connector 80 and also another connector 88 at the remote control unit.

I claim:

1. An audio-visual accessory for remote control of a controllable electronic component, comprising
   a support plate,
   a narrow shelf connected to an edge of the support plate, the shelf being adapted to hold a remote control unit and
   a remote control unit,
   a length of signal transmitting control unit cord having one end connected to the remote control unit and the other end connected to a controllable electronic component
   a recoil mechanism adapted to release and take up the length of control unit and cord between the remote the recoil mechanism, said recoil mechanism being mounted on said support plate at a rearward end of the shelf 2. The apparatus of claim 1 further comprising a housing for covering the recoil mechanism.

3. The apparatus of claim 2 wherein the housing is a rectangular box connected to the support plate and has one side abutting the shelf.

4. The apparatus of claim 3 wherein the abutting side wall has an opening for passage of the length of control unit cord.

5. The apparatus of claim 1 wherein the shelf has a bottom wall extending outwardly from the support plate and a side wall extending upwardly from an outer edge of the bottom wall, wherein the side wall and the support plate are substantially parallel.

6. The apparatus of claim 5 wherein the side wall is stepped.

7. The apparatus of claim 1 further comprising attachment means for attaching the accessory to a controllable electronic component.

8. The appartus of claim 7 wherein the attachment means comprises micro-hook and micro-loop complementary fasteners, wherein one complement is attached to the a controllable electronic component and the other is connected to the accessory.

9. The apparatus of claim 1 wherein the recoil mechanism is a spring recoil mechanism having a takeup reel and provides manual release and automatic takeup due to spring tension, whereby the manual release of cord from the takeup reel adds tension to a spring while the takeup is by means of tension release in the spring.

* * * * *